July 14, 1942.  R. M. STORER  2,289,601
TRAY RELEASE MECHANISM
Filed March 25, 1940  2 Sheets-Sheet 1
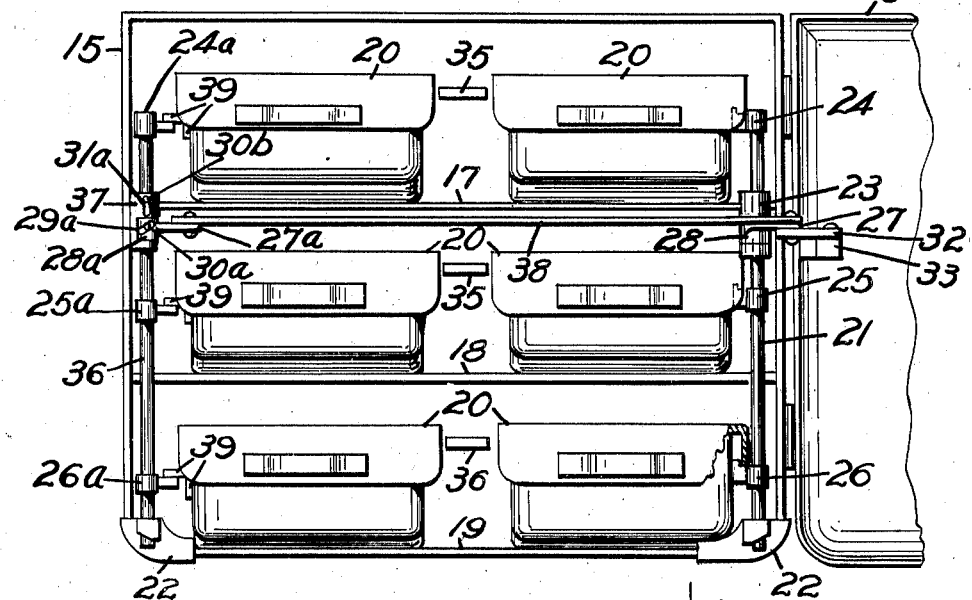
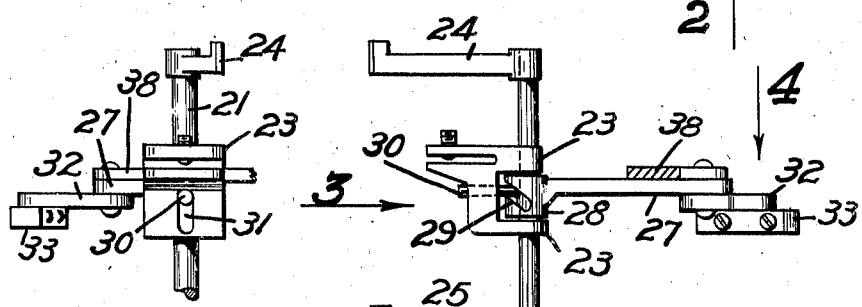
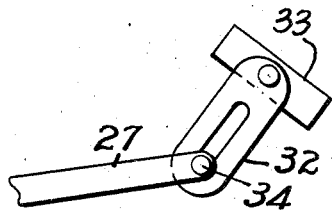
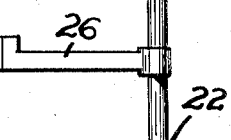
INVENTOR.
RICHARD M. STORER
BY Rollandet, McGrew & Campbell
ATTORNEYS.

July 14, 1942.  R. M. STORER  2,289,601
TRAY RELEASE MECHANISM
Filed March 25, 1940  2 Sheets-Sheet 2
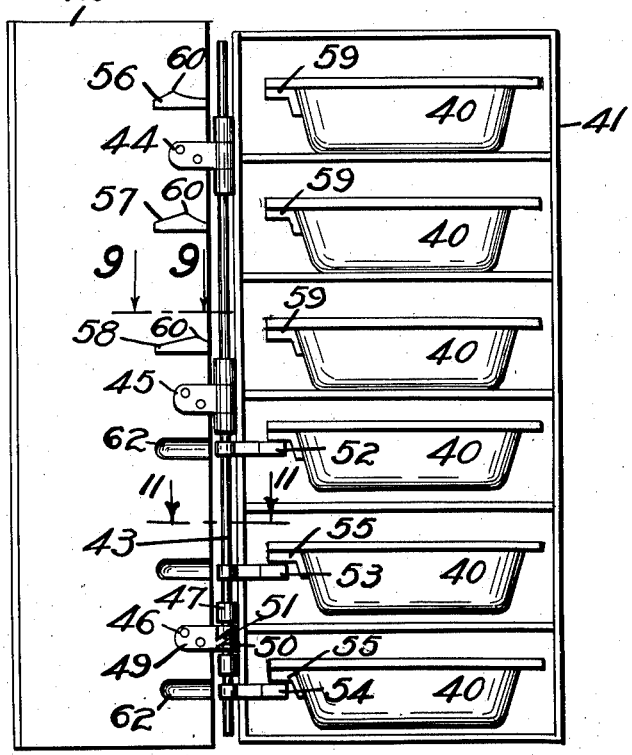
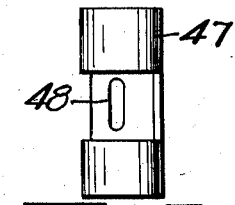
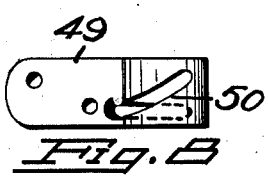
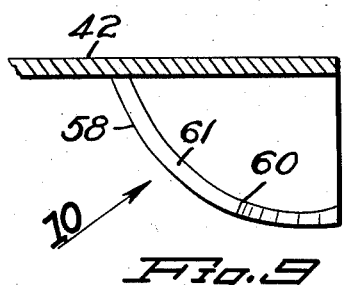
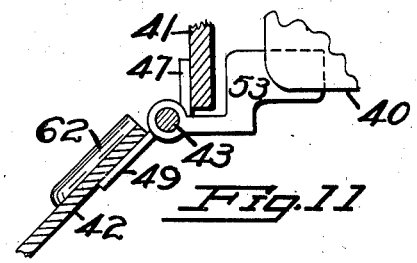
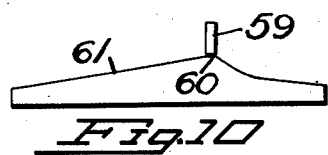
INVENTOR.
RICHARD M. STORER
BY
Rollandet, McGrew & Campbell
ATTORNEYS.

Patented July 14, 1942

2,289,601

UNITED STATES PATENT OFFICE 2,289,601

TRAY RELEASE MECHANISM

Richard M. Storer, Denver, Colo.

Application March 25, 1940, Serial No. 325,832

15 Claims. (Cl. 62—108.5)

This invention relates to improved mechanism for releasing freezing trays from their frost bond with their supporting surfaces in mechanical refrigerators.

As is well-known, the typical domestic type mechanical refrigerators, for example, are provided with a plurality of removable freezing trays, which normally are supported on shelves in the freezing compartment or evaporator, within the refrigerator cabinet.

The individual trays are filled with water or other liquid to be frozen and after a period of freezing, frost is formed within the freezing compartment on the walls and shelf surfaces thereof, and on the exterior surfaces of the freezing trays. This frost tends to form a bond between the bottom of the trays and the upper surfaces of the supporting shelves, which bond must be broken before a tray can be removed.

The present invention relates to improved mechanism for moving the trays slightly to break this troublesome frost bond. The advantages of the present design are three-fold. In the first place, actuating mechanism according to this inventive concept, is supported on the structure that defines the freezing compartment rather than being supported on the trays, and thus is not liable to damage while the trays are out of the freezing compartment. Secondly, means are provided for the release of a plurality of trays from their frost bonds by a common actuating movement, in contradistinction to individual release of trays. And thirdly, mechanism is provided whereby the normal movements of the freezing compartment door are used to break the bond between one or more trays and the supporting surfaces therefor, without materially increasing the effort required in opening such door.

It is a primary object of the present invention to provide bond-breaking mechanism associated with the freezing compartment or evaporator of mechanical refrigerators, which acts on a plurality of freezing trays either simultaneously or progressively.

Another object of the invention is to provide mechanism associated with the freezing compartment or evaporator of mechanical refrigerators, which is automatically operable by movement of the door of such compartment to break the bond between one or more trays and the supporting surface therefor within the compartment.

A further object is to provide mechanism that will move or separate freezing trays with respect to their supporting shelves without spilling the contents of the trays.

Still another object is to provide such mechanism that will in no way interfere with the placement of the trays upon their supporting shelves within the freezing compartment or evaporator.

Other objects and advantages reside in details of design and construction which will be more fully disclosed in the following description and in the drawings wherein like parts have been similarly designated and in which:

Figure 1 is a front elevation of a typical freezing compartment or evaporator in a domestic type mechanical refrigerator, inclusive of freezing trays and mechanism embodying the present inventive concept;

Figure 2 is a detailed elevation illustrating certain mechanism shown in Figure 1 and drawn to a larger scale, as it would appear looking in the direction of arrows 2—2 and shown apart from the evaporator and trays;

Figure 3 is a fragmentary elevation looking in the direction as indicated by arrow 3, Figure 2;

Figure 4 is a fragmentary plan view as indicated by arrow 4 of Figure 2;

Figure 5 is a front elevation of another type of freezing compartment or evaporator, as commonly used in domestic type mechanical refrigerators, inclusive of a plurality of freezing trays and mechanism embodying a modified form of this invention in operative position;

Figure 6 is a detailed illustration of a portion of the mechanism shown in Figure 5 and drawn to a larger scale;

Figure 7 is a top plan view of the part illustrated in Figure 6;

Figure 8 is a detailed illustration of a portion of the mechanism shown in Figure 5 and drawn to a larger scale;

Figure 9 is a fragmentary sectional view taken along the line 9—9 of Figure 5, and drawn to a larger scale for purposes of clarity;

Figure 10 is a developed elevation of Figure 9, looking in the general direction of arrow 10; and Figure 11 is a fragmentary view taken along the line 11—11 of Figure 5, and drawn to a larger scale.

In order to disclose operative reductions to practice of the present inventive concept, the accompanying drawings will be described in detail. These illustrations are intended to disclose the fundamental components of mechanism made according to this invention. Since numerous changes may be made in the details of construction, the instant illustrations are not intended to express or imply any limitation to the invention, the scope of which in reality, is measured by the appended claims.

First, referring to Figure 1, reference character 15 denotes a freezing compartment or evaporator, such as is used in some domestic type mechanical refrigerators. This compartment is provided with a hinged door 16 and shelves 17 and 18, and a bottom 19, which also serves as a shelf or support for some of the freezing trays. The freezing trays are each indicated by reference character 20, two of which are supported on each shelf 17 and 18 and two on the bottom 19.

The mechanism that embodies the present invention and fulfills the stated objects thereof is illustrated in Figures 1, 2, 3 and 4 as being provided with means whereby it can be operatively installed in a refrigerator that was originally built without such mechanism. As this description progresses, it will become manifest that any of the mechanism herein illustrated readily can be included in the original manufacture of domestic type mechanical refrigerators and is so illustrated in certain of the instant examples.

A vertically positioned shaft 21 is provided with a lower journal in a fitting 22 that is provided with a slot and set screws, so that it readily may be fastened onto the edge of the freezing compartment or evaporator 15. Shaft 21 is also journalled in a yoke-like fixture 23 that is provided with a slot and set screw so that it readily may be attached to one of the shelves such as shelf 17 within the evaporator.

Lifter arms 24, 25 and 26 project radially into the freezing compartment from shaft 21 upon which they are securely mounted, and each lifter arm terminates in an upwardly turned hook-like end, which is positioned with reference to the several freezing trays at one side of the evaporator, so that each hooked end may engage a turned-down flanged edge of a tray.

A radially projecting lever arm 27 has an integral hub 28, which is journalled on the shaft 21 for limited rotary movement thereabout, and is held in the yoke-like fitting 23. The hub 28 is provided with a helical slot 29. A pin 30 projects radially from the shaft 21 through the helical slot 29 and a vertically positioned slot 31 in the yoke-like fitting 23.

A link 32 is pivotally attached to a block 33, which in turn is securely fastened to an inner surface of the door 16. A pin 34 connects the arm 27 with the link 32 for limited angular and sliding movement relative thereto.

Stationary guide members 35 may, if desired, be provided in the freezing compartment 15, positioned centrally between the two freezing trays on each shelf. These guide members facilitate proper placement of the trays in the freezing compartment and also prevent the trays moving away from the actuating mechanism hereinbefore described. In some installations, the size of the freezing trays with reference to the width of the freezing compartment is such that the trays are positioned closer together than shown in Figure 1, and also closer to the sides of the compartment. In this more compact arrangement, guide members are not necessary.

It is now obvious that when the door 16 is opened by swinging it upon its hinges, angular movement will be imparted to the lever arm 27, which will in turn rotate the hub 28 and elevate the shaft 21 through the intermediary of the pin 30, the shaft being held from conjoint rotation with the hub 28 because the pin 30 projects through the slot 31 in the stationary fitting 23. Such movement will in turn move the trays with reference to their supports.

The link 32 that transmits actuating force to the lever arm 27 permits the door 16 to be partially opened before the mechanism is actuated. This link also provides a compensating factor for movement of the door relative to the mechanism, since the door and the mechanism are not co-axial but rotate on separate spaced axes. Instead of the link 32 being connected with the door 16, the link could take the form of a handle for manual operation to release a plurality of trays, or the lever arm 27 could be directly manipulated by hand.

Radially projecting arms 24, 25 and 26 will be elevated conjointly with the shaft 21, and they in turn will elevate the trays which they are in a position to engage. However, this elevation of the trays may or may not be simultaneous, it being a preferred arrangement to have the arms 24, 25 and 26 so spaced along the shaft 21 with reference to the normal positions of the trays, that arm 24 engages its tray first, arm 25 its tray next, and arm 26 its tray last in the sequence.

This progressive engagement of the respective arms with the trays serves to break the frost bond between the respective trays and their supporting shelves progressively, which requires less physical effort at any one time than would be required to break the frost bonds of all of the trays simultaneously.

By the progressive arrangement, the tray first contacted by the lifting arm 24 will be elevated from its shelf more than the other trays, as illustrated in Figure 1, but such elevation in any case is relatively small and by no means enough to tip or spill the contents from any tray. This is an important consideration because the contents of one or more trays might still be in liquid form when the door 16 is opened.

Along the other side of the freezing compartment or evaporator 15 is positioned a second vertical shaft 36 which has a lower journal in another fitting 22, and an upper journal in a yoke-like fitting 37, which is securely attached to shelf 17 and is so similar to the yoke-like fitting 23 that an enlarged detailed illustration would appear superfluous.

Another lever arm and hub assembly 27a—28a is rotatably carried on the shaft 36 within the yoke-like fitting 37. This hub 28a is provided with a helical slot 29a, which cooperates with a pin 30a in the shaft 36. Actuating force is transmitted to the lever arm 27a through the intermediary of a connecting rod 38, which pivotally connects the lever arms 27 and 27a. A vertical slot 31a is provided in the fitting 37 and cooperates with another pin 30b on the shaft 36.

Radially projecting lifter arms 24a, 25a and 26a are provided on the shaft 36 and positioned to contact their respective trays progressively. Lifter arms 24a, 25a and 26a are slightly modified from the form of lifter arms shown at 24, 25 and 26 in that they do not have the hook-like outer extremity but are flat throughout their extent and are arranged to contact brackets 39 that are provided on the adjacent trays.

By this combination and arrangement of parts, the shaft 36 is elevated simultaneously with the elevation of the shaft 21 to raise progressively the vertical tier of trays positioned at the other side of the freezing compartment 15.

The installation of mechanism shown in Figure 1 is for the purpose of disclosing certain contemplated variations in the present inventive concept. Preferably, all lifter arms in any given installation would be of the same type, which might be either kind herein illustrated and described. Furthermore, in installations where only a single vertical tier of freezing trays is provided, it is manifest that only one lifter shaft and its associated lifting mechanism and lifter arms would be required, which might be either type herein disclosed.

Referring to Figure 5, a further modified form of the present invention is illustrated wherein a single vertical tier of six freezing trays 40 is illustrated as positioned in a suitable freezing compartment 41, provided with a hinged door 42. A special hinge pin 43 is journalled in hinges 44, 45 and 46, which hinges are attached to the freezing compartment 41 and the door 42 in the usual manner.

The lowermost hinge 46 is a special lifter type hinge consisting of a yoke member 47, Figures 6 and 7, that is provided with a vertical slot 48, and a central member 49 which is attached to the door 42 and which is provided with a helical slot 50. A pin 51 is positioned through the hinge pin 43 so that it extends through the vertical slot 48 and the helical slot 50.

A plurality of lifter arms 52, 53 and 54 are mounted upon the hinge pin 43 in spaced relation therealong with reference to the lowermost three trays 40, so that when the door 42 is opened and the hinge pin 43 is elevated through the intermediary of the lifter hinge assembly 46 and the pin 51, said lifter arms will contact and elevate progressively the trays with which they are associated. Reinforcing brackets 55 may be provided on the trays to be contacted by the lifting arms.

The upper three trays 40 shown in Figure 5 are actuated by means embodying a further modified form of this inventive concept. A plurality of quadrant-shaped cams 56, 57 and 58 are mounted upon the door 42 in a position to contact reinforcing brackets 59 mounted upon the adjacent freezing trays, when the door is opened or closed.

Each cam has a high spot 60, which, as it passes in sliding contact under its associated reinforcing bracket 59, will impart an elevating movement to said bracket and the tray upon which the bracket is mounted. The high spots 60 on the respective cams 56, 57 and 58 are not in alinement but are arranged so that the high spot 60 on cam 56 will contact its associated bracket 59 first, upon opening of the door 42, the high spot on cam 57 will next contact its associated bracket 59, and the lowermost cam 58 will actuate its associated tray the last of the three. As a consequence of this arrangement, progressive lifting of the uppermost three trays 40 is effected, thus reducing the amount of physical effort necessary to do the work of breaking the frost bonds.

A typical developed elevation of one of these cams is illustrated in Figure 10, wherein is provided a relatively long cam surface 61 having a relatively low percentage of incline, which is the actuating surface that elevates the freezing trays as the door is opened. If the door 42 stands open only 90° or less, then the reinforcing bracket 59 of any tray 40 that is being replaced in the freezing compartment, may slide easily up over the gradual cam surface 61.

The installation as shown in Figure 5 is for the purpose of disclosing certain modified forms of this invention. In actual practice, all freezing trays in any given installation preferably would be actuated by the same kind of mechanism, which could be either lifting arms attached to a hinge pin and actuated by a lifter hinge, or else all of the trays would be actuated by cams. Any one of the hinges 44, 45 or 46 could be the lifter type, or two or more lifter hinges can be provided as required.

Depressions 62 may be formed in the door 42 to provide clearance over the lifter arms 52, 53 and 54, when the door is closed. Or openings corresponding with depressions 62 can be provided in the door 42, if preferred.

Obviously, trays that are lifted by lifter arms such as arms 24, 24a or 52, remain slightly tipped up as illustrated in Figures 1 and 5, as long as the door of the freezing compartment or evaporator is open or until the tray is removed.

The cam-actuated trays, as illustrated in Figure 5, automatically will be tipped up or elevated slightly and then set down again upon their supporting shelves as the door is opened and the cams pass in sliding contact under the projecting flanged edges of the trays. After the frost bond is thus broken, any tray easily can be lifted from its supporting shelf.

The actuating surfaces of the helical slots 29, 29a and 50 are, in reality, cam-like surfaces much the same in function as the inclined surfaces on cam elements 56, 57 and 58. These illustrated cam surfaces are arranged to impart an upward component of movement to the trays with reference to their supporting surfaces.

However, movement of a tray with reference to its support need not be vertical because any movement of a tray with reference to its support may be used successfully to break the frost bond. Where simultaneous movement of a plurality of trays is desired, the parts arranged to contact the trays may be uniformly positioned with reference thereto instead of differentially spaced.

No part of any mechanism herein disclosed interferes with the normal placement of any freezing tray into the freezing compartment.

From the foregoing description, it will be apparent that the present invention provides means associated with the evaporator or freezing compartment to act on the trays and break the frost bond, thereby eliminating inconvenience in handling and likelihood of damage occasioned by the presence of release mechanism attached to the trays when they are out of the freezing compartment.

In the various forms of mechanism described and illustrated a plurality of trays are simultaneously or progressively released, either by direct manual actuation, or automatically through manual actuation of the evaporator door.

The form of the invention illustrated in Figures 1 through 4 is particularly adapted for release of a plurality of alined trays and such alinement may be either horizontal or vertical. When the opening movement of the door is utilized as the actuating means for the release mechanism, the effort required to effect the release is not appreciably greater than the normal effort expended in opening the door.

While the movement imparted to the trays in the various release actions illustrated is sufficient to break the frost bond, such movement is controlled to prevent spilling of liquids in any tray within the evaporator, and thus normal action is not impaired.

What I claim is:

1. The combination with a freezing compartment having a tray supported on a surface of the compartment, of a hinged closure for the compartment, a member journalled for limited up and down movement relative to the freezing compartment and having lifting means arranged to act on the upper portion of said tray, a lever arm having a hub rotatably mounted on said member, said hub having a helical slot inclusive of an upwardly inclined surface acting on said member, and means connecting said lever arm with the closure whereby the arm is moved and the member is raised by movement of the closure.

2. The combination with a freezing compartment inclusive of a hinged door and a removable tray in the compartment, of an element positioned out of contact with the compartment walls, having a cam-like inclined surface mounted for pivotal movement adjacent said compartment and connected with said door for movement thereby, and means associated with said surface and with said freezing tray whereby a component of movement relative to said compartment is transmitted from the surface to an upper surface of the tray by movement of the door.

3. The combination with a freezing compartment inclusive of a hinged door and a removable tray in the compartment, of a vertically positioned shaft having lifting means positioned out of contact with the compartment walls and journalled for limited up-and-down movement along said freezing compartment, a lifter arm projecting radially into the compartment in engaging relation to an upper surface of the tray, and having a hub rotatably journalled on the shaft, the hub having an upwardly inclined surface associated with said lifting means on the shaft, and means connecting said lever arm with the door whereby the arm is moved and the shaft is raised by normal pivotal movement of the door.

4. The combination with a freezing compartment inclusive of a hinged door and a removable tray in the compartment, of a vertically positioned shaft having lifting means positioned out of contact with the compartment walls and journalled for limited up-and-down movement along said freezing compartment, a lifter arm projecting radially into the compartment in engaging relation to an upper surface of the tray, and having a hub rotatably journalled on the shaft, the hub having a helical slot inclusive of an upwardly inclined surface associated with said lifting means on the shaft, and means connecting said lever arm with the door whereby the arm is moved and the shaft is raised by normal pivotal movement of the door.

5. The combination with a freezing compartment inclusive of a hinged door and a plurality of trays in vertically spaced relationship therein, of a shaft journalled along said freezing compartment for limited up-and-down movement, a plurality of lifter arms projecting radially from the shaft into the freezing compartment in spaced relation to the walls thereof and in engaging relation to an upper surface of the respective trays, and means associated with the shaft and connected with the door whereby said shaft is elevated by the normal opening of said door.

6. The combination with a freezing compartment inclusive of a hinged door and a plurality of trays in vertically spaced relationship therein, of a shaft journalled along said freezing compartment for limited up-and-down movement, a plurality of lifter arms projecting radially from the shaft into the freezing compartment out of contact with the walls thereof and in engaging relation to an upper surface of the respective trays and positioned on the shaft in differential relationship with the respective trays, and means associated with the shaft and connected with the door whereby said shaft is elevated by the normal opening of said door.

7. The combination with a freezing compartment inclusive of a hinged door and a plurality of trays in vertically spaced relationship therein, of a shaft journalled along said freezing compartment for limited up-and-down movement, a plurality of lifter arms projecting radially from the shaft into the freezing compartment out of contact with the walls thereof and in engaging relation to an upper surface of the respective trays and positioned on the shaft in progressively differential relationship with the respective trays, and means associated with the shaft and connected with the door whereby said shaft is elevated by the normal opening of said door.

8. The combination with a freezing compartment inclusive of a hinged door and a plurality of trays in vertically spaced relationship therein, of a shaft journalled along said freezing compartment for limited up-and-down movement, a plurality of lifter arms having upturned hook-like extremities, projecting radially from the shaft into the freezing compartment out of contact with the walls thereof and in engaging relation to an upper surface of the respective trays and positioned on the shaft in differential relationship with the respective trays, and means associated with the shaft and connected with the door whereby said shaft is elevated by the normal opening of said door.

9. The combination with a freezing compartment inclusive of a hinged door and a tray, of a lifter hinge connecting said door with said compartment, a hinge pin for the door positioned through said hinge, and a lifting arm projecting from said hinge pin into said compartment out of contact with the walls thereof and in tilting engagement with an upper surface of the tray whereby said tray is elevated when the door is opened.

10. The combination with a freezing compartment inclusive of a hinged door and trays in the compartment, of a lifter hinge connecting said door with said compartment, a hinge pin for the door positioned through said hinge, and lifting arms differentially positioned along said hinge pin with respect to the normal position of the trays, projecting from said hinge pin into said compartment out of contact with the walls thereof and in tilting engagement with an upper surface of the tray whereby said trays are progressively elevated when the door is opened.

11. The combination with a freezing compartment inclusive of a hinged door and a removable tray in the compartment, of a member having an upwardly inclined cam-like surface mounted upon said door and extending into said compartment out of contact with the walls thereof in a position to impart an upward component of motion to the tray when the door is opened.

12. The combination with a freezing compartment inclusive of a hinged door and a plurality of removable trays in vertically spaced relation in said compartment, of a plurality of members mounted upon said door in vertically spaced relationship corresponding to the positions of said trays, each of said members having a cam-like upwardly inclined surface and a high spot associated with said surface, said high spots on the respective members being progressively out of vertical alinement, each of said inclined surfaces being normally extended into said compartment out of contact with the walls thereof in a position to impart a vertical component of movement to one of said trays when the door is opened.

13. The combination with a freezing compartment and a removable tray therein, of an upright shaft carried adjacent said compartment and adjacent the tray therein and mounted for longitudinal movement, an arm projecting radially from said shaft into said compartment out of contact with the walls thereof in a position to contact said tray, and mechanism inclusive of a cam-like component associated with the shaft for elevating the same to move the tray with reference to the compartment, and means for manually actuating said cam-like mechanism.

14. The combination with a freezing compartment inclusive of a hinged door and a plurality of trays in vertically spaced relationship therein, of a shaft journalled on said freezing compartment for limited up and down movement, a plurality of lifter arms projecting from the shaft into the freezing compartment in a position to contact an upper portion of the respective trays and positioned on the shaft in progressive differential relationship with respect to the trays, said lifter arms being positioned out of contact with the compartment walls to prevent ice deposit thereon, and means associated with the shaft and connected with the door whereby said shaft is elevated by the opening movement of said door.

15. The combination with a freezing compartment, inclusive of a closure movable with reference thereto, and a removable tray in the compartment, of tray-releasing mechanism associated with said tray and said closure out of contact with the compartment walls to prevent ice deposit thereon, said mechanism being constructed and arranged to engage and tilt an upper surface of said tray by an opening movement of said closure thereby breaking cohesion between tray and compartment.

RICHARD M. STORER.